United States Patent [19]

Waters et al.

[11] Patent Number: 5,088,807
[45] Date of Patent: Feb. 18, 1992

[54] LIQUID CRYSTAL DEVICES

[75] Inventors: Colin M. Waters, Tattingstone; Timothy J. Noakes, Selbourne; Ian Pavey, Fernhurst, all of England; Chiyoji Hitomi, Tsokuba, Japan

[73] Assignee: Imperial Chemical Industries PLC, London, England

[21] Appl. No.: 359,471

[22] Filed: May 23, 1989

[30] Foreign Application Priority Data

May 23, 1988 [GB] United Kingdom ............... 8812135
Nov. 22, 1988 [GB] United Kingdom ............... 8827277

[51] Int. Cl.[5] .............................................. G02F 1/13
[52] U.S. Cl. ...................................... 359/94; 428/1; 359/51
[58] Field of Search .................... 350/347, 331 R, 334, 350/46.17, 96.34; 428/1

[56] References Cited

U.S. PATENT DOCUMENTS

| 4,673,255 | 6/1987 | West et al. ...................... 350/347 V |
| 4,688,900 | 8/1987 | Doane et al. ................... 350/347 V |
| 4,890,902 | 1/1990 | Doane et al. ........................ 350/335 |

FOREIGN PATENT DOCUMENTS

| 0238816 | 11/1985 | Japan ................................. 350/334 |
| 0269116 | 11/1987 | Japan ................................. 350/334 |

Primary Examiner—Rolf Hille
Assistant Examiner—Tan Ho
Attorney, Agent, or Firm—Cushman, Darby & Cushman

[57] ABSTRACT

A liquid crystal device comprises a layer of fibers or filaments (15) permeated with liquid crystal material, the layer (15) being located between electrodes (13, 14) by means of which an electric field can be applied across the layer to vary the transmissivity of the liquid crystal/fiber composite. The diameters of the fibers/filaments are selected so that the light transmissivity of the composite has reduced sensitivity with respect to mismatch of the refractive indices of the liquid crystal and the fibers/filaments.

20 Claims, 1 Drawing Sheet

LIQUID CRYSTAL DEVICES

BACKGROUND OF THE INVENTION

1. Field of the Invention

This invention relates to liquid crystal devices and is particularly concerned with liquid crystal devices in which the liquid crystal material can be selectively controlled by the application of an electric or magnetic field to vary the light transmissivity of the device, as in an optical shutter for example.

2. Description of the Prior Art

It is known from, for example, French Patent No 2139537, U.S. Pat. No. 4435047 and U.S. Pat. No. 4671618 to encapsulate a nematic liquid crystal material as a multiplicity of droplets within a matrix of transparent, encapsulating material across which an electric or magnetic field can be selectively applied. In the field-off state, the nematic liquid crystal molecules in each capsule tend to align with the three dimensional boundary wall of the encapsulating material bounding the capsule so that collectively, the liquid crystal molecules do not have any preferred overall direction of alignment. In this condition, the liquid crystal material is insensitive to the polarization of light incident on the device and the device is then substantially opaque.

When a field of suitable magnitude is applied to the device, the tendency of the liquid crystal molecules to align with the boundary walls of the capsules is overcome and the molecules under the influence of the applied field tend to re-orientate into generally parallel alignment and in this condition light can be transmitted through the device.

It is also known from U.S. Pat. No. 4411495 that selective light transmission through a liquid crystal device can be effected by dispersing a liquid crystal material within a layer comprising a porous filter material made of mixed esters of cellulose and controlling the refractive index of the liquid crystal material by the application of an electric field to produce conditions in which the refractive indices of the liquid crystal and filter material are matched or mismatched. When the refractive indices are matched, the device is transmissive and, when they are mismatched, the device becomes opaque to incident light. It will be noted that refractive index changes are fundamental to the operability of devices constructed in accordance with U.S. Pat. No 4411495.

SUMMARY OF THE INVENTION

According to a first aspect of the present invention there is provided a liquid crystal device comprising containment means enclosing liquid crystal material, means for applying an electric or magnetic field across the liquid crystal material and a permeable body of optically non-absorbing material permeated by the liquid crystal material such that light transmission through the composite comprising said body and the liquid crystal material is reduced in the off state of said field-applying means, characterized in that said permeable body comprises fibers or filaments deposited to form a layer.

According to a second aspect of the present invention there is provided a liquid crystal device comprising containment means enclosing liquid crystal material, means for applying an electric or magnetic field across the liquid crystal material, and a permeable body of optically non-absorbing material permeated by the liquid crystal such that light transmission through the composite comprising said body and the liquid crystal material is reduced in the off state of said field-applying means, characterized in that said permeable body comprises fibers or filaments having diameters such that, in the field-on liquid crystal-aligned state of the device, the light transmissivity of said composite is substantially insensitive to differences of up to 0.01 in the ordinary refractive indices of the liquid crystal material and said fibers/filaments.

As noted above, in the device of U.S. Pat. No. 4411495, light transmissivity is governed by matching/mismatching of the refractive indices. The same also applies to the encapsulating approach taught in French Patent No 2139537 and U.S. Pat. Nos. 44350 and 4671618. In a device according to the present invention, light transmissivity in the field-on state can be made less sensitive to refractive index mismatch by appropriate selection of the fiber/filament diameters, ie the present invention is based on the recognition that the light-scattering required in the field-off state of the device may be provided by means of a permeable body comprising small diameter fibers or filaments while securing a high degree of optical clarity in the field-on state even when a refractive index mismatch exists. This is because the light scattering effect caused by refractive index mismatch is related to fiber or filament diameter and can be reduced if the fiber/filament diameters are on the submicronic scale.

Of course, while light scattering is an undesirable effect in the field-on state, it is necessary in the field-off state to provide a light shutter or valve effect. In a device according to the invention, in the field-off state less reliance is placed on light scattering due to refractive index mismatch—indeed the small fiber/filament diameters inherently lead to reduced light scattering by this mechanism. Instead, advantage is taken of another light-scattering mechanism which comes into play in the field-off state when the fiber/filament diameters are appropriately small. This latter mechanism is believed to arise from the formation within the liquid crystal material of domains in which the local refractive index is different from adjacent domains because the liquid crystal molecules are differently aligned, such domain-formation being promoted, it is believed, by the production of disclinations when small diameter fibers or filaments are introduced into the liquid crystal material.

Thus, according to another aspect of the present invention, a liquid crystal device is characterized in that the permeable body comprises fibers or filaments which are so dimensioned and distributed that, in a reduced transmissivity state of the composite comprising the liquid crystal material and said fibrous or filamentary permeable body, the fibers/filaments are instrumental in the formation of domains in the liquid crystal material on a scale such that at least 25% of the scattering of incident light by the composite is attributable to the formation of said domains. Preferably at least 40% of the light scattering is attributable to domain formation and more preferably the light scattering in the field-off state is attributable predominantly to the formation of domains as a consequence of the presence of appropriately small diameter fibers/filaments.

The liquid crystal material is conveniently nematic but may be cholesteric, nematic doped with cholesteric, or smectic.

The fiber/filament diameters are preferably such that, in the field-on, fully aligned state, the light transmissivity of the composite varies by no more than 10% (more preferably 5%) in response to ordinary refractive index differences ranging up to 0.01 (up to 0.02 and beyond is also feasible within the scope of the invention). As used herein, the term "light transmissivity" is used to refer to the quantity 100%—haze (%) where the haze value is measured in the manner described hereinafter.

Because the constraint of precise refractive index matching can be relaxed, in a typical device according to the invention, there may be a refractive index mismatch present (for example 0.012 or even larger) coupled with a light transmissivity of at least 90% in the field-on, fully aligned state.

By "fully-aligned" is meant a state in which the magnitude of the applied field is sufficient to align substantially all of the liquid crystal molecules with the applied field direction.

In the field-off state, the transmissivity of the composite is preferably less than 30% (more preferably 20%).

Preferably at least a major proportion of said fibers/filaments have sub-micronic diameters. Advantageously, at least 50% (more preferably 70%) of the fibers/filaments have diameters not greater than 500 nanometer (nm), more preferably 300 nm.

The permeable body is conveniently in the form of a mat of fibers or filaments, which may be produced by a spinning technique, eg electrostatic, centrifugal or blow spinning.

In a specific embodiment of the invention, the containment means includes a pair of spaced boundary walls, at least one of which is transparent, both boundary walls being provided with electrode means whereby an electric field can be applied across the space between them. It is not necessary in all cases for both boundary walls to be transparent, one may for example be reflective.

The permeable fibrous or filamentary body is enclosed within the space between the boundary walls and is impregnated with the liquid crystal material. The overall thickness of the liquid crystal layer and the permeable body is typically 1–40 microns, eg 10 microns.

The fibrous or filamentary body may initially be enclosed between the boundary walls and the liquid crystal material may be subsequently introduced into the fibrous or filamentary body, for example, by introducing the liquid crystal material at one or more points along the edge or edges of the assembly comprising the fibrous or filamentary body/boundary walls and, in this case, the permeable body may act as a wick to aid distribution of the liquid crystal throughout substantially the entire extent of the permeable body.

In another embodiment, the permeable body may be deposited on one of the layers of material which is to constitute one of the boundary walls; the liquid crystal may then be applied to the permeable body to fill the voids thereof and the second boundary wall may thereafter be assembled to enclose the liquid crystal-impregnated permeable body. Application of the liquid crystal to the permeable body may be effected by, for example, a coating apparatus in which the liquid crystal is spread over the permeable body, while the latter is exposed, by means of a rotating roller which dips into a reservoir of the liquid crystal. Alternatively, the liquid crystal may be applied by spraying it on to the exposed permeable body.

In a presently preferred method, the permeable body is formed in situ on one of the boundary walls, prior to assembly of the boundary walls with the permeable body, by spinning fibers on to said one boundary wall to form a mat. Spinning may be effected by any suitable technique, for example, electrostatic, centrifugal or blow spinning.

The fibers can be melt spun, but preferably are spun from solutions of fiber-forming polymers chemically inert with respect to the liquid crystal material. The structure of the fibrous mat thus produced can be stabilized in the former case by arranging conditions such that the fibers are still soft when they fall on each other and, in the latter case, such that they still contain some solvent. Fiber-forming materials which cure in flight, either through contact with air or other ambient gas, or through applied heat or radiation, eg ultraviolet light, or through mixing of reactive precursors during spinning, can also be used, and again stabilization of the resulting mat can be achieved by contacting the fibers before cure is complete. Fusion or bonding between the fibers themselves is generally preferred to application of a size or other bonding agent to the loosely-formed mat, although this latter does provide an alternative useful in some applications. Generally suitable polymers for solution spinning are polyvinyl alcohol and polyvinyl butyral, both of which can be sprayed from a solution in a water/methanol mixture, to produce a mat substantially chemically inert to most common liquid crystals. Other examples include polyvinyl chloride, polyvinyl formal, various cellulose derivatives, polystyrene, polymethyl methacrylate, polyether imide and polyether sulphone.

Examples of polymers that can be used in melt spinning fibers include polypropylene, polyethylene and terephthalate.

In another embodiment of the invention, the fibers can be formed from polymers which are produced by the polymerization or cross-linking of monomers or oligomers prior to or following spinning of the fiber. Examples of monomers and oligomers which can be formed into polymers either prior to or following spinning include epoxy resin, UV curable and/or thermocurable acrylic monomers and oligomers, and vinyl monomers and oligomers.

The material of which the boundary walls are composed may have a refractive index which matches either the liquid crystal material or the material of the fibers or filaments. This may be achieved for example by fabricating the walls and the fibers from the same material or materials which have substantially the same refractive index.

BRIEF DESCRIPTION OF THE DRAWING

The invention will now be described with the aid of the embodiment illustrated by way of example only in the accompanying drawings, and also with reference to the Examples that follow.

In the drawings.

DETAILED DESCRIPTION OF THE PRESENTLY PREFERRED EXEMPLARY EMBODIMENT

Figure 1:
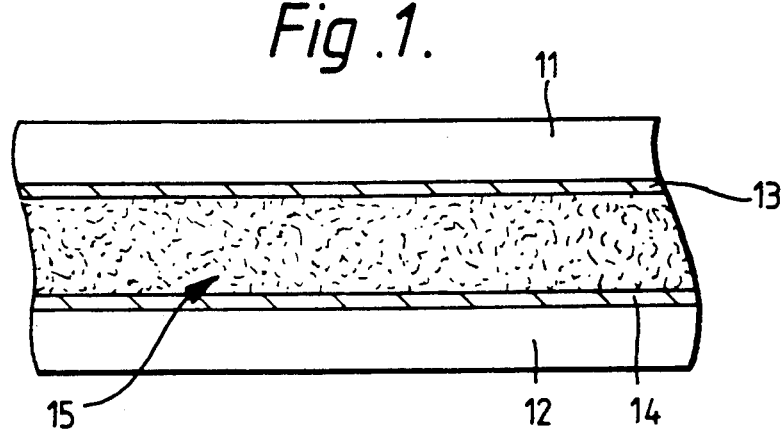
FIG. 1 is a schematic view of an optical shutter-type liquid crystal device.

Referring to FIG. 1, the device illustrated is an optical shutter which is switchable between a state in which it is substantially transparent to incident light and a state in which it is substantially opaque. The device comprises a containment cell defined by upper and lower boundary walls 11, 12 and sides (not shown). The walls 11, 12 ar composed of a flexible transparent plastics material, the contiguous faces of which each have a layer 13, 14 of a transparent conductive material such as indium tin oxide applied thereto whereby an electrical field can be applied between the electrodes 13, 14. The walls 11, 12 are spaced apart and enclose therebetween a skeletal fibrous structure 15, the intersecting fibers of which define a myriad of interconneced voids filled with liquid crystal material so that the space between the boundary walls is occupied by a layer of liquid crystal material in which the fibrous structure 15 is, in effect, immersed. The fibrous structure 15 may be produced as a mat by a suitable spinning technique.

Figure 2:
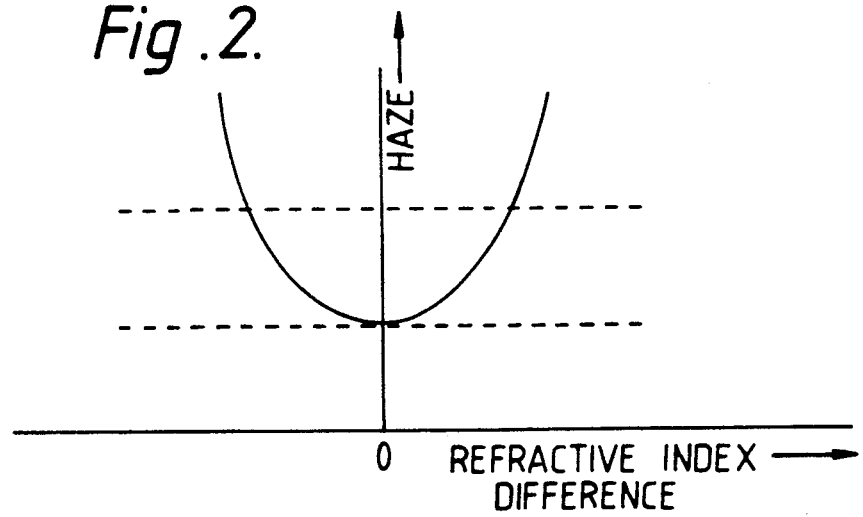
FIGS. 2 and 3 are graphs illustrating qualitatively variation of haze with refractive index difference.
Figure 3:
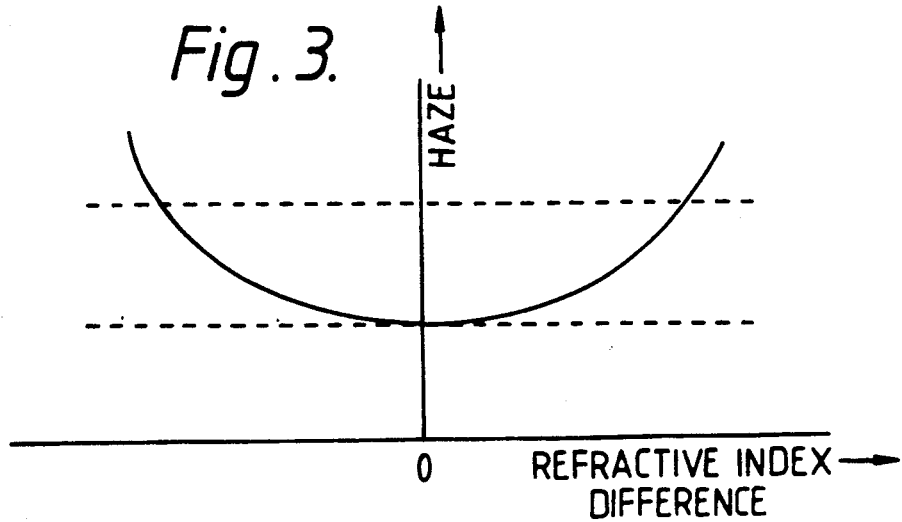

The fibers are formed with sub-micronic diameters so that the need for close matching of the ordinary refractive indices of the liquid crystal material and the material from which the fibers are formed can be relaxed while allowing good contrast to be achieved between the transparent and opaque states of the device. FIGS. 2 and 3 illustrate qualitatively the variation of haze (which is inversely related to transmissivity) with the difference in ordinary refractive indices of the liquid crystal and the fibers when the electric field is applied, via electrodes 13, 14, to orient the liquid crystal molecules with the field direction. In the case of FIG. 2, the fibers are of a relatively large diameter such that the refractive index mismatch has a significant influence on transmissivity. In the case of FIG. 3, in accordance with the invention the fibers have sub-micronic diameters. In both cases, it will be seen that the haze is at a minimum (corresponding to maximum transmissivity) when the refractive indices of the liquid crystal and the fibers are precisely matched. However, as the refractive index difference increases, the increase in haze is much more marked in the case of FIG. 2 and consequently the transmissivity of a device having larger fiber diameters is more sensitive to refractive index mismatch.

Before proceeding to the Examples, the following terms which are used herein will be explained.

"Haze values" are given as percentages—Haze (0 V) and Haze (100 V) for instance correspond to values measured with voltages of zero volts (i.e. no applied field) and 100 volts applied between the electrodes of the device, haze values being measured in accordance with ASTM Standard D1003 by means of a Hazemeter as manufactured by Tokyo Instrument Company Limited of Japan.

"Contrast"—this is calculated as [Haze (0 V)—Haze (100 V)]/Haze (0 V).

"Average Fiber Diameter"—a statistical average of diameter values obtained from sample measurements using scanning electron microscopy (SEM).

"Percentage of fibers having a diameter less than X nm"—a statistical computation based on sample measurements using SEM.

"$n_o$": ordinary refractive index of liquid crystal materials.

"$n_f$-$n_o$": refractive index difference between the fiber material and the liquid crystal.

"Decreasing Haze Percentage": $\frac{Haze(0V) - Haze(30V)}{Haze(0V) - Haze(100V)}$

EXAMPLE 1

Using polyvinyl butyral (PVB) (obtained from Hext Co. Ltd, BGOT) as the polymer for fiber formation, this was dissolved in isopropyl alocohol to obtain a 6% solution. 0.25 g of Coronate HL (obtained from Nippon Polyurethane Co. Ltd of Japan, to be abbreviated as NPU) was added as the cross-linking agent to 50 g of the polyvinyl butyral solution followed by shaking until uniformly dissolved. An indium oxide (15:5) based transparent, conductive film was then sputtered to a thickness of 500 Å on to a polyester film which was then cut into 7 cm × 7 cm pieces having thickness of 100 μm. The above PVB solution was then dispersed for three minutes onto the above conductive polyester film using an electrostatic spinning apparatus, the flow rate of the above polymer solution being 2.0 cc/hr and the nozzle voltage being 25 KV DC, to obtain a transparent fiber mat/polyester film assembly. This assembly was then placed in an oven and allowed to stand for 1 week at 50° C. to perform cross-linking treatment of the PVB. Upon measuring the fiber diameters of the fiber mat/film assembly that was obtained following cross-linking treatment, using scanning electron microscopy, the average diameter was found to be 0.32 μm and the percentage of fibers having a diameter of 0.5 μm or less was 63%. Following this, various liquid crystals (products of the Merck Co Ltd) having different refractive indices indicated in Table 1 were permeated into the fiber mat. Following permeation of the liquid crystals, another polyester film with a transparent, conductive film was placed on the existing film to sandwich the liquid crystal filled fiber mat. The electro-optical characteristics of the liquid crystal display element obtained in this manner are indicated in Table 1. As is clear from Table 1, Haze (100) did not exhibit major fluctuations with respect to changes in the difference in refractive indices between the liquid crystal and fiber, and indicated values that were somewhat low (3.5-5.1%). Therefore, in the case of liquid crystal display elements that were produced using small diameter fibers, it was found that restrictions on the difference in refractive indices of the fiber material and the liquid crystal could be relaxed considerably. In addition, it can also be seen from Table 1 that good contrast values were obtained.

EXAMPLE 2

Other than increasing the polymer concentration from 6% to 10%, a cross-link treated fiber mat/film assembly was produced using the same prescription as Example 1. Upon measurement of fiber diameter, the average diameter was 0.87 μm and the percentage of fibers having a diameter of 0.5 μm or greater was 18%. After respectively permeating the resulting fiber mats with Merck liquid crystals ZLI 1289 ($n_o$: 1.517), E-37 ($n_o$: 1.522) and E-49 ($n_o$: 1.527), the liquid crystal display device was produced in the same manner as that of Example 1. The electro-optical characteristics of the liquid crystal display obtained in this manner are indicated in Table 1. As is clear from Table 1, in all of these cases, Haze (100) demonstrated low values. In addition, good contrast values were obtained.

EXAMPLE 3

Using polyvinyl alcohol (PVA) BDH Co. Ltd, MW: 125,000) as the polymer, this was dissolved in a solution consisting of isopropyl alcohol and water (mixture ratio: 50%:50%) to obtain a 3.5% solution. After preparing the conductive polyester film in the same manner as Example 1, the above solution was then dispersed for three minutes onto the above conductive polyester film using an electrostatic spinning apparatus, at a flow rate of the above polymer solution of 2.0 cc/hr and with a nozzle voltage of 28KV DC, to deposit on the polyester film a transparent, fiber mat. After curing the fibers in the same manner as Example 1, upon measuring the fiber diameters of the above film using scanning electron microscopy, the average diameter was found to be 0.35 μm, and the percentage of fibers having a diameter of 0.5 μm or less was 90%. After various liquid crystals (products of the Merck Co Ltd) having different refractive indices indicated in Table 2 were permeated into the fiber mat, the liquid crystal display element was produced in the same manner as Example 1. The electro-optical characteristics of the liquid crystal display element obtained in this manner are indicated in Table 2. As is clear from Table 2, Haze (100) demonstrated low values (2.2–5.5%) without exhibiting major fluctuations with respect to changes in the difference in refractive indices between the liquid crystal and fiber. Therefore, in the case of liquid crystal display elements that were produced using small diameter fibers, it was found that restrictions on the refractive index of the liquid crystal could be relaxed considerably. In addition, good contrast values were obtained.

wherein said permeable body comprises at least one of fibers and filaments deposited to form a layer.

2. A device as claimed in claim 1 in which said fibers or filaments have diameters such that, in the field-off state, domain formation is promoted in the liquid crystal material on a scale such that at least 25% of light attenuation in the off-state is attributable to light scattering as a result of domain formation.

3. A device as claimed in claim 1 in which the ordinary refractive indices of the liquid crystal material and said fibers/filaments differ and the light transmissivity of said composite is at least 90% in the field-on liquid crystal-aligned state.

4. A device as claimed in claim 3 in which said refractive indices differ by at least 0.005.

5. A device as claimed in claim 3 in which said refractive indices differ by up to 0.01.

6. A device as claimed in claim 3 in which said refractive indices differ by up to 0.012.

7. A device as claimed in claim 1 in which at least a major proportion of said fibers/filaments have submicronic diameters.

8. A device as claimed in claim 1 in which 50% of said fibers/filaments have diameters no greater than 500 nm.

9. A device as claimed in claim 1 in which at least 70% of said fibers/filaments have diameters no greater than 500 nm.

10. A device as claimed in claim 1 in which the fibers/filaments have an average diameter less than 1 micron.

11. A device as claimed in claim 1 in which the fibers/filaments have an average diameter less than 750 nm.

TABLE 1

| EXAMPLE NO. | FIBRE AV. DIA (μm) | FIBRE % LESS THAN 0.5 μm | LIQUID CRYSTAL GRADE | $n_o$ | $[n_p - n_o]$ (absolute value) | HAZE (100 V) % | HAZE (0 V) % | HAZE DECREASING RATIO (%) | CONTRAST |
|---|---|---|---|---|---|---|---|---|---|
| 1-1 | 0.32 | 63 | ZLI 2214 | 1.490 | 0.025 | 4.8 | 80.8 | 81.5 | 0.94 |
| 1-2 | 0.32 | 63 | ZLI 1691 | 1.499 | 0.016 | 4.2 | 76.3 | 80.5 | 0.94 |
| 1-3 | 0.32 | 63 | ZLI 3238 | 1.505 | 0.010 | 4.3 | 83.2 | 85.2 | 0.95 |
| 1-4 | 0.32 | 63 | ZLI 1289 | 1.517 | 0.003 | 3.5 | 90.2 | 87.2 | 0.96 |
| 1-5 | 0.32 | 63 | E-37 | 1.522 | 0.007 | 4.9 | 78.3 | 86.3 | 0.94 |
| 1-6 | 0.32 | 63 | E-49 | 1.527 | 0.012 | 5.1 | 92 | 70.3 | 0.95 |
| 2-1 | 0.87 | 18 | ZLI 1289 | 1.517 | 0.003 | 4.9 | 90.8 | 90.2 | 0.95 |
| 2-2 | 0.87 | 18 | E-37 | 1.522 | 0.007 | 5.1 | 76.9 | 83.6 | 0.93 |
| 2-3 | 0.87 | 18 | E-49 | 1.527 | 0.012 | 10.0 | 83.3 | 67.7 | 0.87 |

TABLE 2

| EXAMPLE NO. | FIBRE AV. DIA (μm) | FIBRE % LESS THAN 0.5 μm | LIQUID CRYSTAL GRADE | $n_o$ | $[n_p - n_o]$ (absolute value) | HAZE (100 V) % | HAZE (0 V) % | HAZE DECREASING RATIO (%) | CONTRAST |
|---|---|---|---|---|---|---|---|---|---|
| 3-1 | 0.35 | 90 | ZLI 2214 | 1.490 | 0.029 | 4.0 | 63 | 83.5 | 0.94 |
| 3-2 | 0.35 | 90 | ZLI 1691 | 1.499 | 0.020 | 3.5 | 80.8 | 81.2 | 0.96 |
| 3-3 | 0.35 | 90 | ZLI 3238 | 1.505 | 0.014 | 3.3 | 72.2 | 84.4 | 0.95 |
| 3-4 | 0.35 | 90 | ZLI 1289 | 1.517 | 0.002 | 2.2 | 80.9 | 91.4 | 0.97 |
| 3-5 | 0.35 | 90 | E-37 | 1.522 | 0.003 | 5.3 | 83 | 91.4 | 0.94 |
| 3-6 | 0.35 | 90 | E-49 | 1.527 | 0.008 | 5.5 | 90 | 65.1 | 0.94 |

We claim:

1. A liquid crystal device comprising:
   means for containing liquid crystal material,
   means for applying one of an electric and magnetic field across the liquid crystal material, and
   a permeable body of optically non-absorbing material permeated by the liquid crystal material such that light transmission through a composite, comprising said body and the liquid crystal material, is reduced in an off state of said field-applying means, 12. A device as claimed in claim 1 in which the fibers/filaments have an average diameter less than 500 nm.

13. A device as claimed in claim 1 in which said permeable body comprises a mat of said fibers or filaments.

14. A device as claimed in claim 13, wherein said mat is a spun mat, that is, one produced by spinning.

15. A device as claimed in claim 1 in which, in the field-off state, the transmissivity of said composite is less than 30%.

16. A device as claimed in claim 1 in which, in the field-off state, the transmissivity of said composite is reduced predominantly by light scattering by domains formed in the liquid crystal material as a consequence of the presence of submicronic fibers or filaments therein.

17. A liquid crystal device comprising:
means for containing liquid crystal material,
means for applying one of an electric and magnetic field across the liquid crystal material,
and a permeable body of optically non-absorbing material permeated by the liquid crystal such that light transmission through a composite comprising said body and the liquid crystal material is reduced in an off-state of said field-applying means,
wherein said permeable body comprises at least one of fibers and filaments having diameters such that, in a field-on liquid crystal-aligned state of the device, light transmissivity of said composite is substantially insensitive to differences of up to 0.01 in ordinary refractive indices of the liquid crystal material and said fibers/filaments.

18. A device as claimed in claim 17 in which said fiber/filament diameters are such that, in the field-on, aligned state the light transmissivity of said composite varies by no more than 10% in response to ordinary refractive index differences ranging up to 0.01.

19. A device as claimed in claim 17 in which said fiber/filament diameters are such that, in the field-on, aligned state the light transmissivity of said composite varies by no more than 5% in response to ordinary refractive index differences ranging up to 0.01.

20. A device as claimed in claim 17 in which said insensitivity is exhibited for ordinary refractive index differences ranging up to 0.02.

* * * * *